United States Patent [19]

Yoon

[11] Patent Number: 5,770,052
[45] Date of Patent: Jun. 23, 1998

[54] DEVICE FOR CONTROLLING THE RATIO OF PURE WATER TO CONCENTRATED WATER IN WATER PURIFIERS

[75] Inventor: Deok-Joong Yoon, Suwon, Rep. of Korea

[73] Assignee: Samsung Electronics Co., Ltd., Suwon, Rep. of Korea

[21] Appl. No.: 681,915

[22] Filed: Jul. 30, 1996

[30] Foreign Application Priority Data

Jul. 31, 1995 [KR] Rep. of Korea .................. 95-23548

[51] Int. Cl.⁶ .................................................. B01D 61/12
[52] U.S. Cl. .................... 210/94; 210/137; 210/321.65; 210/541
[58] Field of Search ...................... 210/85, 94, 96.2, 210/143, 195.2, 257.2, 323.1, 335, 138, 321.65, 541, 542, 137, 282; 116/309, 310; 55/274

[56] References Cited

U.S. PATENT DOCUMENTS

| | | | |
|---|---|---|---|
| 3,053,268 | 9/1962 | Schulze et al. ................... | 210/138 |
| 3,390,773 | 7/1968 | Merten ............................... | 210/321.65 |
| 3,552,566 | 1/1971 | Lowe et al. ........................ | 210/321.65 |
| 3,812,370 | 5/1974 | Laviolette ......................... | 55/274 |
| 4,176,063 | 11/1979 | Tyler ................................. | 210/321.65 |
| 5,096,574 | 3/1992 | Birdsong et al. .................. | 210/96.2 |

*Primary Examiner*—Joseph W. Drodge
*Attorney, Agent, or Firm*—Burns, Doane, Swecker & Mathis, L.L.P.

[57] ABSTRACT

A water purifier includes a casing and filters disposed in the casing for receiving unpurified water and producing purified water and waste water therefrom. A ratio of purified water to waste water being produced is controlled by a control knob rotatably mounted in a control box disposed exteriorly on a wall of the casing. The control knob rotates beneath a setting point marked on a wall of the control box. The control knob includes a plurality of regularly spaced indicator marks which can be selectively brought into alignment with the set point to enable a setting of the control knob to be visually determined.

5 Claims, 3 Drawing Sheets

DEVICE FOR CONTROLLING THE RATIO OF PURE WATER TO CONCENTRATED WATER IN WATER PURIFIERS

BACKGROUND OF THE INVENTION

1. Field of the Invention

The present invention relates, in general, to water purifiers used for removing various harmful materials from tap water an,d providing pure potable water and, more particularly, to a structural improvement in a device for controlling the amount of concentrated water in such water purifiers to provide a structurally-improved concentrated water controlling means, which controls the ratio of the amount of purified water to concentrated water and allows a user to check a preset ratio, to the outer wall of a water purifier's casing.

2. Description of the Conventional Art

In a typical water purifier used for providing pure potable water, tap water such as city water passes through a filtering means so that various harmful materials are removed from the tap water. The typical water purifiers have been generally classified into several types, that is, natural-filtering type water purifiers, serial-filtering type water purifiers, ion exchange resin type water purifiers and reverse osmotic type water purifiers.

In a typical reverse osmotic water purifier, tap water is pressurized and passes through a synthetic osmotic membrane thereby being purified. The above synthetic osmotic membrane filters off various heavy metals, bacteria and cancer-causing materials from the tap water but exclusively allows pure water with dissolved oxygen to pass therethrough. The reverse osmotic water purifiers have been typically used in updated science industries, the medical field and high precision electronic industries. The reverse osmotic water purifying technique also has been actively used with domestic or business water purifiers recently due to water contamination.

FIGS. 1 and 2 show the construction of a typical water purifier. As shown in the drawings, a filter unit A comprising a series of filters is installed inside the casing 1 of the water purifier. The filters of the unit 4 are connected to a water supply pipe 3 in series. The pipe 3 extends from a tap 2 so that the filters of the unit A remove various harmful materials from tap water such as city water, which is supplied from the tap 2 through the pipe 3, thus purifying the water. A purified water tank 5 is placed over and connected to the filter unit 4. The above tank 5 contains the purified water discharged from the filter unit 4. The water purifier also includes two additional water tanks, that is, hot water tank 7 and cold water tank 8 which are placed under the purified water tank 5. The hot and cold water tanks 7 and 8 are connected to the purified water tank 5 through respective pipes 6. The purified water of the tank 5 is discharged into the hot water tank 7 and is heated to an appropriate hot temperature prior to being served to users. Meanwhile, the cold water tank 8 cools the purified water discharged from the tank 5. Provided In the hot water tank 7 is a heater 9, which heats purified water inside the tank 7. Meanwhile, a cooling coil 10 is wound about the cold water tank 8 and performs a water cooling operation by a refrigerating cycle in order to cool the water inside the tank 8. A water distributing pipe 12 extends from the top of each of the hot and cold water tanks 7 and 8 to the outside of the front panel 11 of the casing 1. Two taps, that is, hot and cold water taps 13 are mounted to the exposed ends of the distributing pipes 12 outside the front panel 11 of the casing 1, respectively. The taps 13 distribute hot and cold purified water from the tanks 7 and 8, respectively. The filter unit A is detachably held by two snap fitting brackets 15 so that the unit 4 is vertically arranged Inside the casing 1. The fitting brackets 15 are mounted to the rear surface of a vertical wall 14, which is vertically placed centrally inside the casing 1.

The control unit of the water purifier is provided on the back wall of the casing 1 as shown in FIG. 3. In the control unit, cold and hot water switches 16 and 17 are provided on one side of the back wall of the casing 1, while a temperature fuse member 18 and a concentrated waste water controlling knob 19 are provided on the other side of the back wall In operation of the above water purifier, the tap water is supplied from the tap 2 to the filter unit 4 through the pipe 3. Various harmful materials such as heavy metals, bacteria and cancer-causing materials from the tap water are removed from the tap water while the water passes through the filter unit 4. One of the filters in the unit 4 contains a synthetic osmotic membrane against which the tap water is forced. Water passing through the membrane is purified. Water not passing therethrough is deemed waste or concentrated water and is discharged to a waste line (not shown). The ratio of purified water to concentrated water can be controlled by the user via the knob 19 which adjusts a concentrated water control valve (not shown). The purified water is primarily contained in the tank 5 and in turn is discharged to the hot and cold water tanks 7 and 8. The purified water in the hot water tank 7 is heated to an appropriate hot temperature by the heater 9, while the water in the cold water tank 8 is cooled to an appropriate low temperature by the water cooling coil 10. When the taps 13 are opened by a user, hot and cold purified water of the tanks 7 and 8 flows to the taps 13 through the pipes 12 and in turn is served to the user.

In the above water purifier, the passage inside the concentrated water control valve (not shown) is selectively adjusted by manually rotating the concentrated water controlling knob 19 disposed outside the casing 1. In this regard, the knob 19 is installed outside the casing 1 so that the knob 19 protrudes on the back wall of the casing 1 as described above. Since the knob 19 protrudes outside the casing 1, the preset position of the knob 19 may be undesirably changed by an impact, vibrations or mishandling of the knob 19 during the handling or operation of the water purifier. Thus, the ratio of the amount of purified water to concentrated water may be undesirably changed from the preset desirable ratio of, for example, 1:3 - 1:5. However, the knob 19 has no means for allowing the users to check the preset position of the knob once the position of the knob has been undesirably changed. In this regard, the changed position of the knob cannot be recognized by the users so that the water purifier may be operated with an undesirable ratio of the amount of purified water to concentrated water. When the ratio is lower than the desirable ratio, the water purifier wastes much tap water. On the contrary, when the ratio is higher than the desirable ratio, the filters of the unit A are rapidly contaminated so that the expected life span of the filters, which are the important elements of the water purifier, is shortened. In this case, the operational performance of the water purifier is reduced.

SUMMARY OF THE INVENTION

It is, therefore, an object of the present invention to provide a device for controlling the amount of concentrated water in water purifiers in which the above problems can overcome and which allows a user to easily recognize an undesirable changing of the preset position of the concentrated water controlling knob and reset the position of the knob to the desirable position thus always maintaining the desirable ratio of the amount of purified water to concentrated waste water.

It is another object of the present invention to provide a device for controlling the amount of concentrated water in water purifiers which allows the desirable ratio of the amount of purified water to concentrated water to be maintained thus lengthening the expected life span of the filters and improving the operational performance of the water purifiers.

In order to accomplish the above objects, a device for controlling the amount of concentrated water in a water purifier in accordance with the present invention comprises a setting point, which is marked in the recess of the control box provided on the outer casing of the water purifier. The device also comprises a concentrated water controlling knob adapted for controlling the amount of concentrated water thus controlling the ratio of the amount of purified water to the concentrated water in the water purifier. The above knob is rotatably installed in the recess at a position just below the setting point and has a plurality of regularly-spaced notch marks, which cooperate with the above setting point in order to allow a user to check the preset position of the knob.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 2:
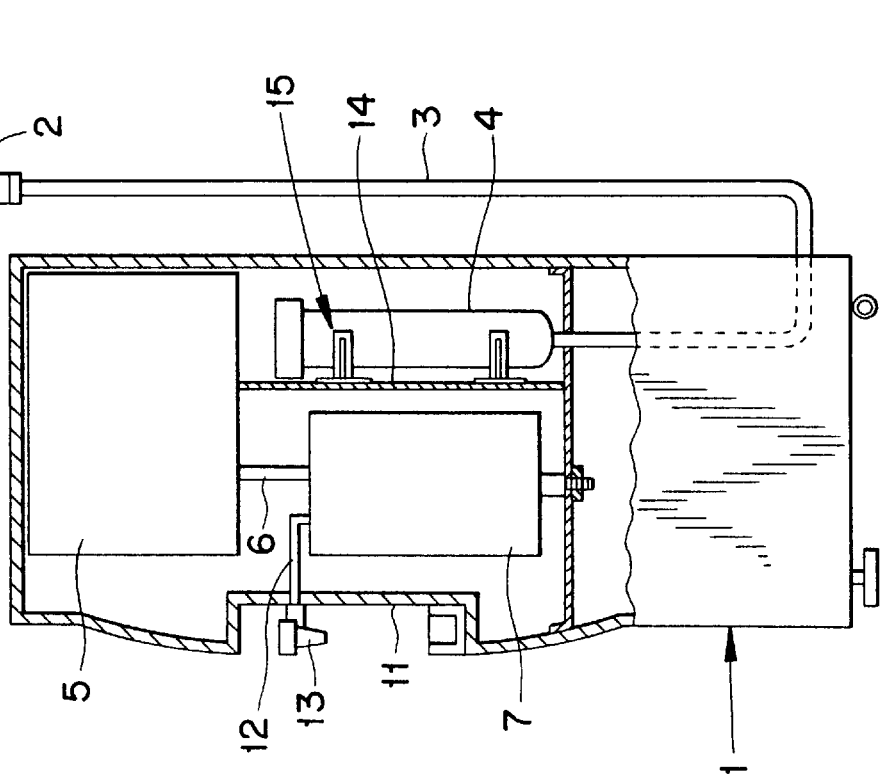
FIG. 2 is a sectional side view showing the construction of the water purifier of FIG. 1.
Figure 1:
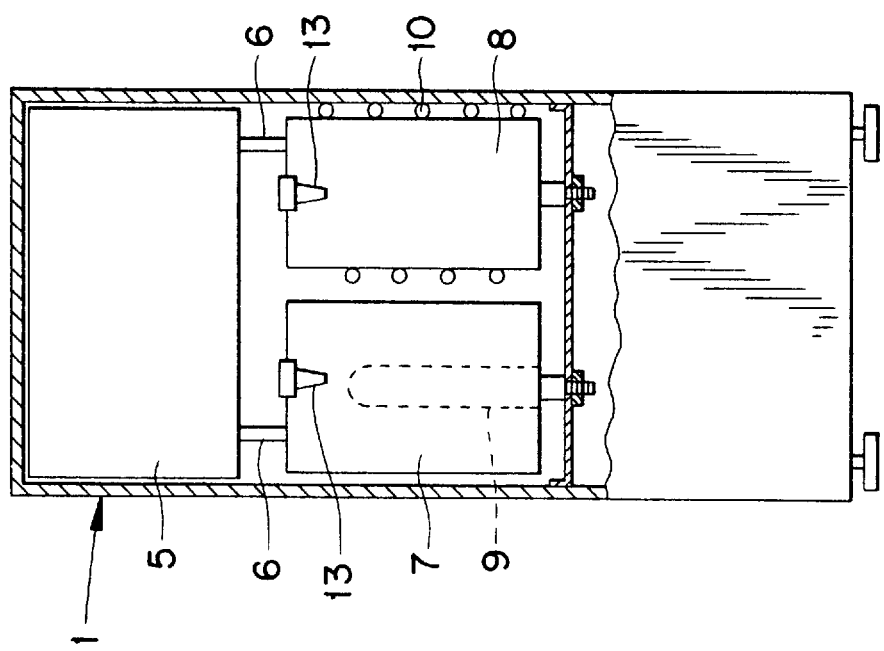
FIG. 1 is a partially sectioned front view of a typical water purifier; 10
Figure 4:
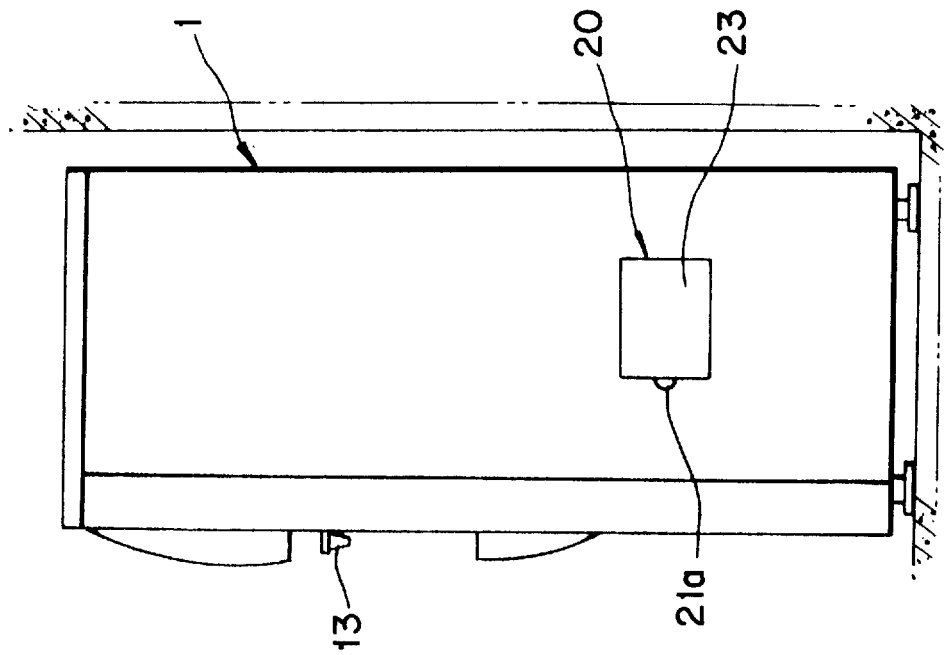
FIG. 4 is a side view of a water purifier, showing an integrated control box which is provided on a side wall of the water purifier and includes a concentrated water controlling device in accordance with a preferred embodiment of the present invention.
Figure 3:
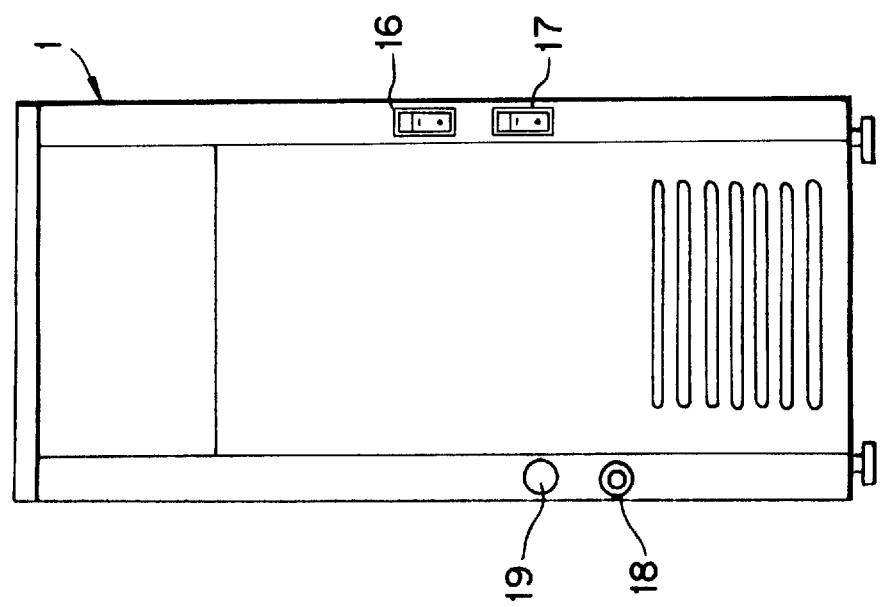
FIG. 3 is a rear view of the typical water purifier, showing the control unit provided on the back wall of the water purifier.
Figure 5:
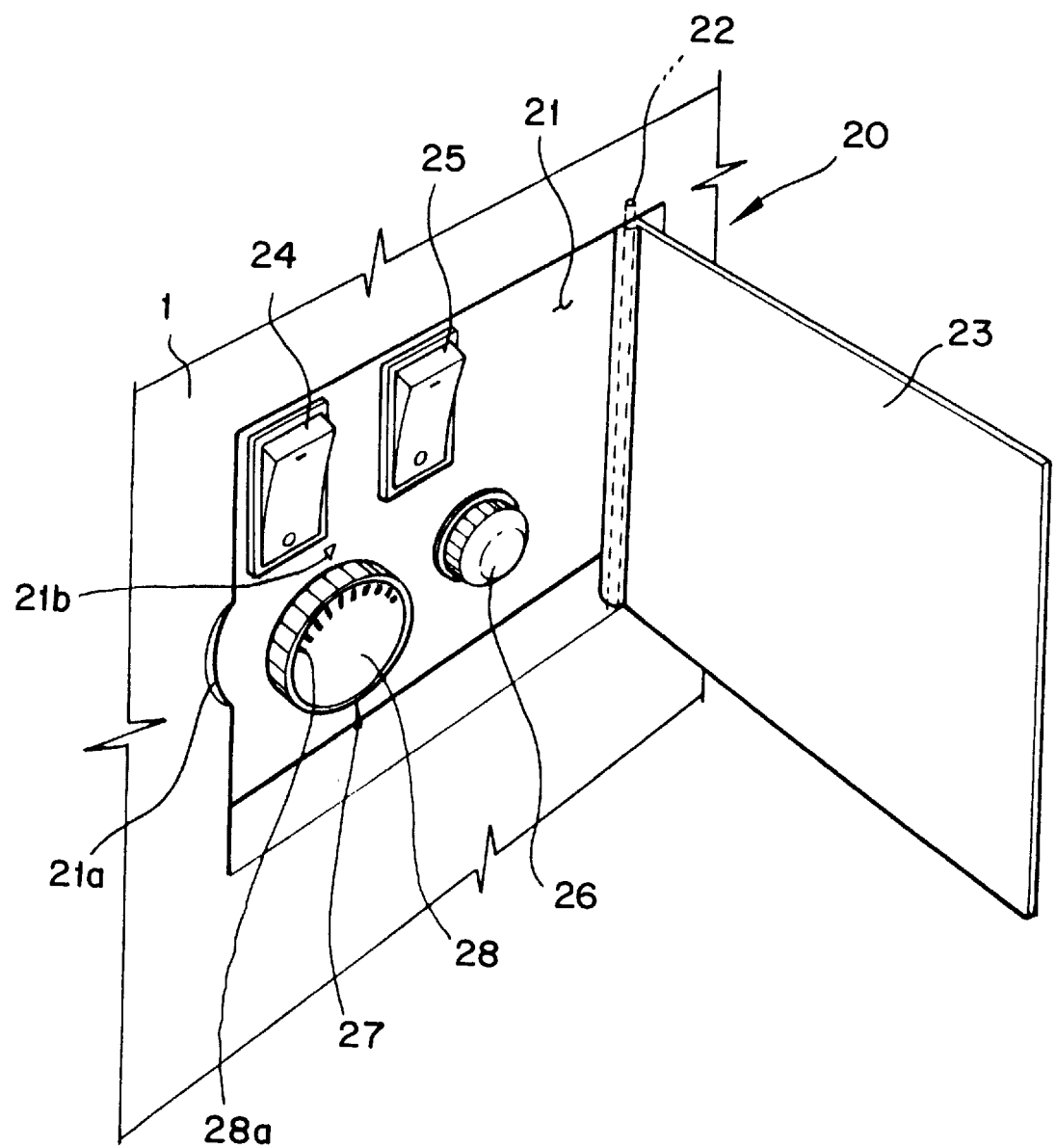
FIG. 5 is a perspective view showing the construction of the integrated control box of FIG. 5.

FIG. 4 is a side view of a water purifier, showing an integrated control box which is provided on a side wall of the water purifier and includes a concentrated water controlling device in accordance with the preferred embodiment of this invention. FIG. 5 is a perspective view showing the construction of the integrated control box of FIG. 5. In FIGS. 4 and 5, the elements common to both the prior art of FIGS. 1 to 3 and the present embodiment will carry the same reference numerals and further explanation is thus not deemed necessary.

In FIGS. 4 and 5, the reference numeral 20 denotes a control box which is provided externally on a side wall of a water purifier's casing 1. The control box 20 comprises a recess 21 which is formed by recessing the side wall of the casing 1. A door 23 is hinged to one side edge of the above recess 21 by means of a hinge pin 22. The other side edge of the recess 21 is provided with an arcuate finger opening 21a for allowing a user's finger to easily reach a free side of the door 23 when opening the door 23.

The control box 20 also has a switch part including hot and cold water switches 24 and 25. The switches 24 and 25 are installed inside the recess 21 and control the water heating and cooling mechanisms, respectively.

The water inside the tanks 6 and 7 Is heated and cooled by the heater 9 and cooling coil 10, respectively. A temperature fuse member 26 is installed inside the recess 21 under the switch part. The fuse member 26 selectively short-circuits the electric power supply when the peripheral temperature caused by the heating operation of heater 9 is higher than reference point. The device for controlling the amount of concentrated water includes a concentrated water controlling knob 27, which is rotatably installed in the recess 21 to one side of the fuse member 26. The amount of concentrated water is controlled by rotating the knob 27 to a desired position. The preset position of the knob 27 can be displayed on the knob 27 thus being easily checked by users.

In order to allow the users to check the preset position of the knob 27, a setting point 21b is marked in the recess 21 at a position just above the knob 27. In addition, a plurality of regularly-spaced notch or indicator marks 28a are provided on a part of the edge of the circular front surface of the knob 27. One of the above marks 28a is selectively aligned with the setting point 21b when the knob 27 is rotated. When the mark 28a, which is aligned with the setting point 21b, is marked with a distinguishable sign, the mark 28a allows the users to check the preset position of the knob 27 and in turn check the preset amount of concentrated water. In the preferred embodiment of this invention, the marks 28a are provided on the knob 27 by attaching a sticker 28, which is printed with the marks 28a, onto the front surface of the knob 27 as shown in FIG. 5.

However, it should be understood that the marks 28a may be provided on the knob 27 by a panel (not shown), which is provided with the marks 28a and is integrated with the knob 27 into a single body. As a further alternative, a plurality of light emit diodes (LEDs, not shown) may be placed inside the knob 27 at positions corresponding to the respective marks 28a. In this case, the LEDs selectively emit light in order to display the preset position of the knob 27 when one of the marks 28a is aligned with the setting point 21b.

In operation of the water purifier, tap water is supplied to the filters of the filter unit 4 through the water supply pipe 3. Various harmful materials, such as heavy metals, bacteria and cancer-causing materials, are removed from the tap water while the water passes through the filters. In the above process inside the filters, a part of the tap water is thus purified in order to provide purified water, which in turn is contained in the purified water tank 5. Meanwhile, the other part of the water is drained from the water purifier as concentrated water with the harmful materials. In order to set the ratio of the amount of purified water to concentrated water prior to delivery of the water purifier to a user, the knob 27 of the control box 20 is rotated in either direction to adjust the ratio to a desirable point within the range of, for example, 1:3 –1:5 as shown in FIG. 5.

When the knob 27 is rotated as described above, one of the notch marks 28a printed on the sticker 28 is aligned with the setting point 21b. The mark 28a, which is aligned with the setting point 21b, is marked with a distinguishable sign by, for example, a color pen. Therefore, the preset position of the knob 27 can be checked by users even when the position of the knob 27 is undesirably changed by an impact, vibrations or mishandling of the knob 27 during the handling or operation of the water purifier. The users thus can easily reset the position of the knob 27 so that the desirable ratio of the amount of purified water to concentrated water can be maintained irrespective of the impact, vibrations mishandling of the knob 27.

In accordance with the concentrated water controlling device of this invention, the desirable ratio of the amount of purified water to concentrated water can be maintained regardless of an impact, vibrations or mishandling of the knob 27. The contamination of the filters is thus remarkably reduced so that the expected life span of the filters is lengthened and thereby improves the operational performance of the water purifier.

The purified water of the tank 5 in turn is supplied to the hot and cold water tanks 7 and 8 through respective pipes. The purified water in the hot water tank 7 is heated by the heater 9, while the water in the cold water tank 8 is cooled by the cooling coil 10.

When the taps 13 are opened by a user, hot and cold purified water of the tanks 7 and 8 flows to the taps 13 through the pipes 12 and in turn is served to the user. In this case, each tap 13 may be opened by, for example, pressing the lever (not shown) of the tap 13 using a cup. The pressing force, which is applied to the lever of the tap 13 by the cup, opens the packing (not shown) inside the tap 13, thus opening the tap 13.

As described above, the present invention provides a device for controlling the amount of concentrated water in water purifiers. In the preferred embodiment of this invention, the device Includes a concentrated water controlling knob, which is rotatably mounted inside a control box of the water purifier's casing. A setting point is marked in the control box at a position Just above the knob. In addition, a sticker, which is printed with a plurality of regularly-spaced notch marks, is attached to the circular front surface of the knob. The above notch marks are selectively aligned with the setting point when the knob is rotated in order to set the amount of concentrated water in the water purifier. The notch mark, is aligned with the setting point, is marked with a distinguishable sign by, for example, a color pen. Therefore, the preset position of the knob can be easily checked by users even when the position of the knob is undesirably changed by an Impact, vibrations or mishandling of the knob during the handling or operation of the water purifier. The users thus can easily reset the position of the knob so that the desirable ratio of the amount of purified water to concentrated water can be maintained irrespective of the impact, vibrations or mishandling of the knob. Another advantage of the above device resides in that the contamination of the filters is remarkably reduced so that the expected life span of the filters is lengthened and thereby improves the operational performance of the water purifier.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a water purifier including a casing, filters disposed in the casing for receiving unpurified water and producing therefrom purified water and waste water, and a control knob for regulating a ratio of pure water to waste water; the improvement wherein the casing includes a control box disposed on a wall thereof and accessible from outside of the casing, the control knob being mounted for rotation within the control box; a setting point marked in the control box; the control knob carrying a plurality of regularly-spaced indicator marks selectively alignable with the setting point to enable a setting of the control knob to be visually determined.

2. In the water purifier according to claim 1, the improvement further comprising a sticker adhered to the control knob and having the indicator marks.

3. In the water purifier according to claim 1, the improvement wherein the indicator marks are formed directly on the control knob which is a one-piece element.

4. In the water purifier according to claim 1 the improvement wherein the indicator marks comprise notches.

5. In the water purifier according to claim 1, the improvement wherein the control knob is disposed beneath the setting.

* * * * *